(12) United States Patent
Teel et al.

(10) Patent No.: US 12,210,646 B2
(45) Date of Patent: *Jan. 28, 2025

(54) CRYPTOGRAPHIC DATA ENTRY BLOCKCHAIN DATA STRUCTURE

(71) Applicant: Rubidex, LLC, Lutz, FL (US)

(72) Inventors: Steven Teel, Lutz, FL (US); Michael Felker, Lutz, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/728,744

(22) Filed: Apr. 25, 2022

(65) Prior Publication Data

US 2023/0039531 A1   Feb. 9, 2023

Related U.S. Application Data

(63) Continuation of application No. 17/192,776, filed on Mar. 4, 2021, now Pat. No. 11,314,885.

(60) Provisional application No. 62/985,129, filed on Mar. 4, 2020.

(51) Int. Cl.
G06F 21/62 (2013.01)
G06F 16/22 (2019.01)
G06F 16/248 (2019.01)
H04L 9/06 (2006.01)
H04L 9/32 (2006.01)
H04L 9/00 (2022.01)

(52) U.S. Cl.
CPC ...... G06F 21/6227 (2013.01); G06F 16/2255 (2019.01); G06F 16/248 (2019.01); H04L 9/0618 (2013.01); H04L 9/3297 (2013.01); H04L 9/50 (2022.05)

(58) Field of Classification Search
CPC ............ G06F 21/6227; G06F 16/2255; G06F 16/248; H04L 9/0618; H04L 9/3297
See application file for complete search history.

(56) References Cited

U.S. PATENT DOCUMENTS

| 11,314,885 B2* | 4/2022 | Teel ................ H04L 9/0618 |
| 2019/0073146 A1* | 3/2019 | Ateniese ........... H04L 9/0816 |
| 2021/0073212 A1* | 3/2021 | Conley ............ H04L 9/3213 |

* cited by examiner

*Primary Examiner* — Oleg Korsak
(74) *Attorney, Agent, or Firm* — Maynard Nexsen PC; Michael Henson

(57) ABSTRACT

A method for securely storing and transmitting data using a blockchain structure. The blockchain structure is operated on the local node and through SSH transmission with an arbiter server and cloud infrastructure. The local application coordinates the order of appended blocks, where each block is a flat file that uses a respective filename to indicate block order. Data entry and retrieval is performed where plaintext data is available only in local memory as decrypted through an authorized client. Data written to disk only as encrypted.

19 Claims, 10 Drawing Sheets

FIG. 8

CRYPTOGRAPHIC DATA ENTRY BLOCKCHAIN DATA STRUCTURE

CROSS-REFERENCE TO RELATED APPLICATIONS

This application is a continuation of U.S. patent application Ser. No. 17/192,776, filed Mar. 4, 2021, now allowed, which claims priority to U.S. Provisional Patent Application No. 62/985,129, filed Mar. 4, 2020, both of which are incorporated by reference herein in their entireties.

TECHNICAL FIELD

The disclosure relates to identifying cryptographic data structures involved in storing data in distributed networks.

BACKGROUND

Conventional databases include a number of flaws. For example, many databases suffer from security issues. Data is stored or transmitted unencrypted and presents a target that can be compromised by malicious actors. Every day corporate databases are breached, and records are stolen. A second issue results from corruption—a total loss of database data due to outside factors, such as lightning strikes, power outages, human error, bad timing, etc.

Cryptocurrency blockchain data storage includes difficulty of modifying data based on the inherent immutability and overall data structure of known blockchain systems. Specifically, stored data is tied to a financial system rather than a true data storage system. Stored data in cryptocurrency systems is tied to coins and if one wants to change stored data, they must navigate a largely unorganized blockchain. Cryptocurrency is ultimately an inefficient an ineffective data storage system.

Known data encryption schemes tend to have inherent vulnerabilities that create targets for attackers.

BRIEF DESCRIPTION OF THE DRAWINGS

FIG. 8 is a screen shot of a data entry interface and an associated blockchain.

DETAILED DESCRIPTION

Figure 1:
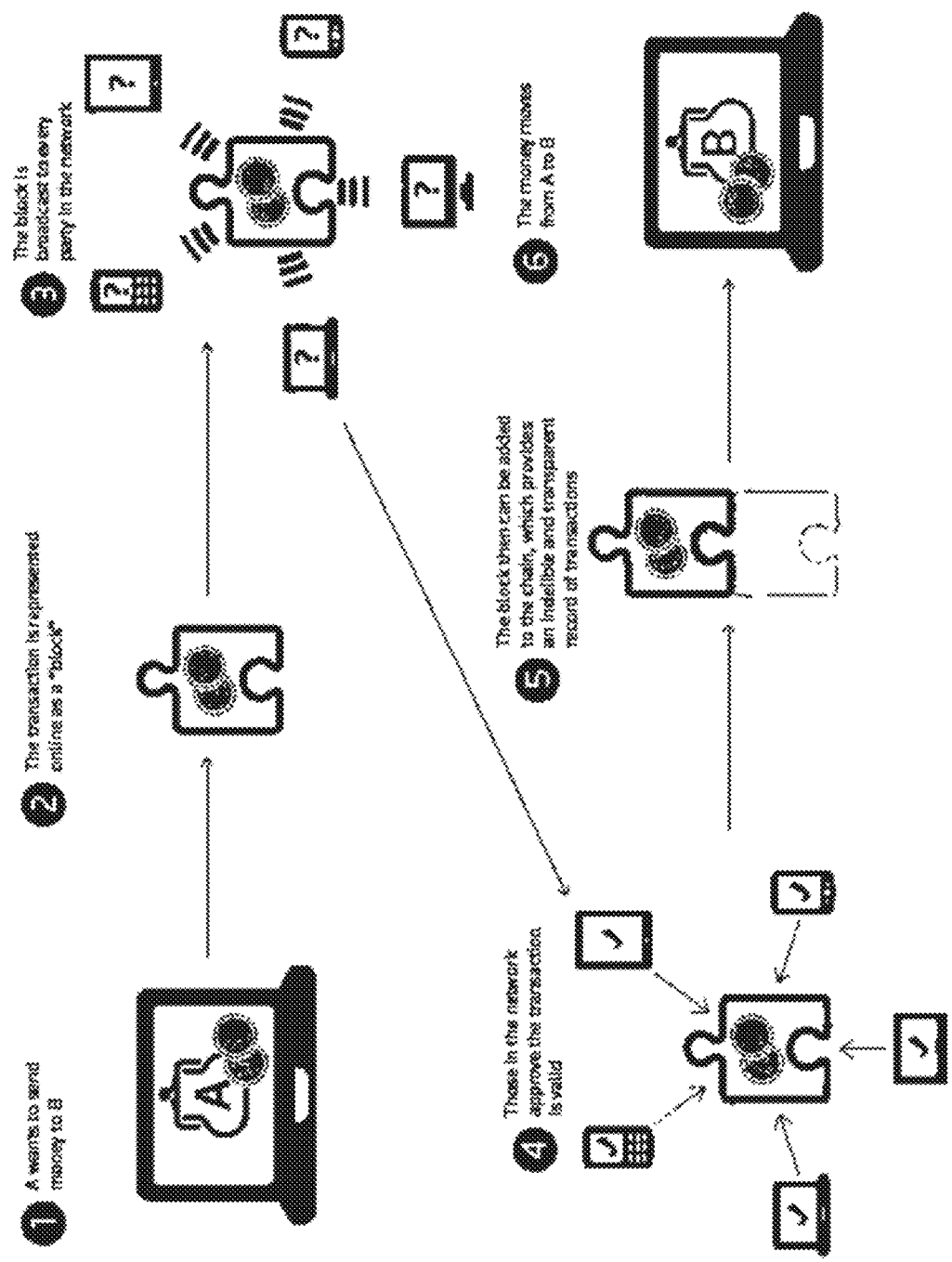
FIG. 1 is a block diagram of a known blockchain data structure. Cryptocurrency networks operate on a distributed network architecture (Prior Art).

Typical blockchains are cryptographic data structures wherein a distributed network contributes to an immutable ledger of data. Blockchain systems are often associated with a base of users that are identified via cryptographic key pairs including a public key (used to refer to the user, acts as an address) and a private key (used to sign actions taken by the user, related to the public key by a one-way function). New data is submitted to the network and nodes within the network append the data to the end of the blockchain. Blockchain systems have many advantages over conventional databases. That is, there is no data loss because the structure will merely continue to grow. There is no data loss due to corruption because the network is distributed and synchronization between nodes means that damaged nodes can be repaired with data stored by peers. Blockchains are also significantly harder to attack than databases because the data is distributed and, for the most part, immutable.

The blockchain data structure is perhaps most well-known as associated with cryptocurrency. Fundamentally, a blockchain is a distributed linked list. Many systems have been built on top of cryptocurrency networks, but those systems are inherently based on the existence of some underlying currency and the use thereof. Cryptocurrency applications of blockchains are thus not the most effective structure for effectively managing a single entity data entry system.

Herein, is described a system whereby users of a given entity are each nodes on a distributed network. Each node does not have to be a full node (e.g., store the full blockchain) to participate. When nodes sync after logging in from a period of inactivity, those nodes first obtain the most recent block in the chain before working backwards toward the genesis block. Data in blocks is stored in small, flat files that include the simplest expression of the information. Stored data is encrypted into ciphertext. Viewing plaintext data is performed in memory to reduce an attack window for malicious users. For the purposes of this disclosure, "plaintext" is the complement of "ciphertext" and means data that is not encrypted or is pre-encryption (in the case of multiple cycles of encryption). Plaintext is the input of one or more functions that generate ciphertext.

Blockchains are immutable; that is, once appended, the data of the block is difficult, if not impossible, to change. However, data entry often includes modifications or edits to data. Where data in a given block needs to be changed, the system spawns a new, branch blockchain structure using the block containing the relevant data as a genesis block. As that data is edited new blocks are appended to the branch blockchain. Where cryptocurrency systems cannot handle branch blockchains because they refer to currency assets that require freedom of movement, stored data is a different construct that does not need the same flexibility. While the present system includes structural variations from cryptocurrency blockchains, some fundamental architecture is retained.

FIG. 1 is a block diagram of a known cryptocurrency based blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history on a given node must be consistent with the history of at least a majority of other nodes. This consistency rule has an important effect of causing the blockchain to be immutable. In order to effectively attack a blockchain such as Bitcoin or Ethereum (current version) one must control 51%+ of the processing power of the entire network. Where the network is comprised of thousands of nodes, assembling the requisite 51% is exceedingly difficult.

When a given node intends to generate a transaction, the transaction is propagated throughout the nodes until it reaches a node or group of nodes that can assemble that transaction and other transactions generated during a contemporaneous period of time into a block. Until a transaction appears in a block it is not published or public. Often a transaction isn't considered confirmed until a requisite number of additional blocks have been added.

At the time of this filing, Bitcoin blocks are limited to the size of 4 MB and are generated approximately every 5 to 15 minutes. This illustrates an important limitation of the Bitcoin network, that it only processes approximately 7 transactions per second. Conversely, Ethereum limits block size based on the amount of processing the contracts in the given block call for and are appended every 5 to 20 seconds. While cryptocurrency networks technically begin processing transactions in real-time, and the existence of a block including a given transaction verifies that transaction's authenticity, until that block is published to the blockchain, the transaction is not verified.

Gaps in verification time introduces the issue within the Bitcoin network at a given moment of "who has the money." During the 10 to 15-minute span between block generation transactions that have been submitted may not actually process. This would occur when a user spends money they didn't have, or double spends. This is not to say the network has no verification mechanism between blocks. For example, when a given user attempts to pay another user, the system may easily query older blocks to inspect the given user's balance as of at least the most recently published block. If the given user has sufficient funds, it is moderately safe to trust the transaction.

However, if the given user is attempting to double spend all their money, only one of those transactions will publish in the next block. The other will be rejected (the transaction that is rejected, and that transaction that processes are subject to a race condition and not necessarily dependent on time of generation). When discussing trivial amounts of money (e.g., paying for coffee), this is not really a big concern. However, when handling larger purchases that occur quickly (e.g. stock in a company), the amounts can become significantly greater, and a clearance time of 10-15 minutes is not ideal.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect event driven software that runs on the blockchain. That software is open source and subject to inputs that are related to the blockchain itself. Of course, one can still write code including vulnerabilities, but the platform enables greater security and fewer weak links in the chain.

Figure 2:
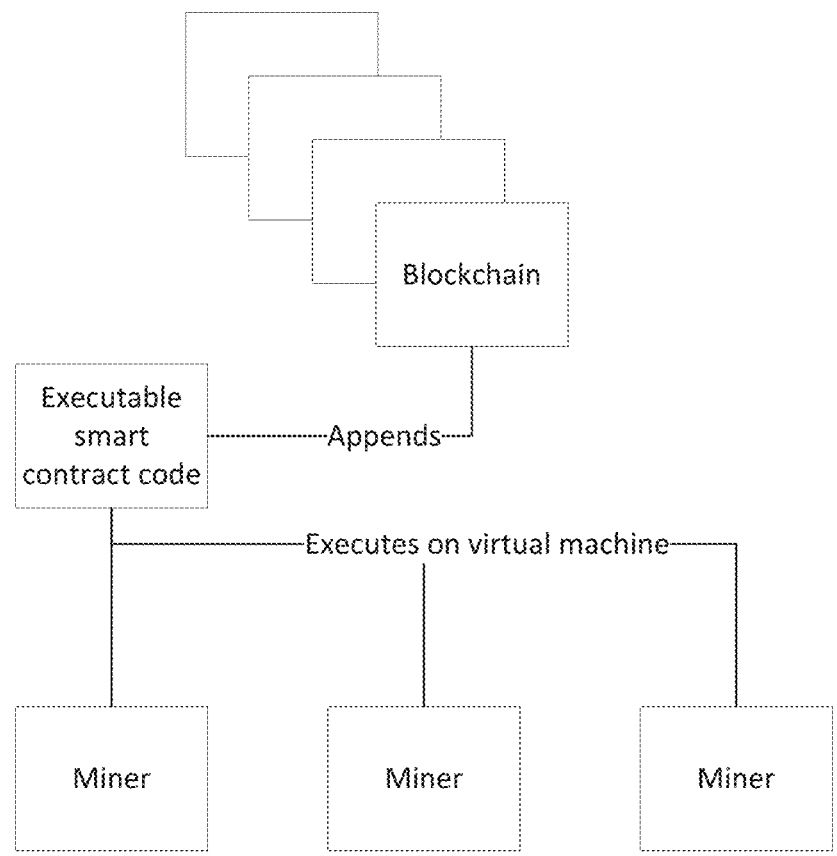
FIG. 2 is a block diagram illustrating a known data structure of a smart contract (Prior Art).

FIG. 2 is a block diagram illustrating a known data structure of a smart contract. Smart contracts and decentralized applications ("dApps") execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require fewer computational resources. For example, a multiplication instruction may require 5 gas, whereas an addition instruction may require 3 gas. Conversely, more complex instructions, such as a Keccak256 cryptographic hash requires 30 initial gas and 6 additional gas for every 256 bits of data hashed.

The purpose of gas is to pay for the processing power of the network on execution of smart contracts at a reasonably steady rate. That there is a cost at all ensures that the work/processing being performed is useful and valuable to someone. Thus, the Ethereum strategy differs from the Bitcoin transaction fee, which is only dependent on the size in kilobytes of a transaction. Because Ethereum's gas costs are rooted in computations, even a short segment of code can result in a significant amount of processing performed. The use of gas further incentivizes coders to generate efficient smart contracts/algorithms. Otherwise the cost of execution may spiral out of control. Unrestricted, an exponential function may bankrupt a given user.

While operations in the Ethereum virtual machine (EVM) have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain is ERC-20 token (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Thus far discussion has been focused around Bitcoin and Ethereum. As applicable in this disclosure, these are base cryptocurrencies. Other base cryptocurrencies exist now and in the future. This disclosure is not limited to application on specifically the Bitcoin or Ethereum blockchains.

The concept of utility tokens is understood in the blockchain space today. Utility tokens represent access to a network, and a give utility token purchase represents the ability to buy goods or services from that network—for example, an arcade token allows users to play an arcade game machine. Utility tokens give users that same type of access to a product or service. On the other hand, custom tokens represent complete or fractional ownership in an asset (such as shares in a company, a real-estate asset, artwork, etc). Owning a stake in a company, real estate, or intellectual property can all be represented by custom tokens. Custom tokens offer the benefit of bringing significant transparency over traditional paper shares through the use of the blockchain and its associated public ledger. Custom token structure, distribution, or changes that could affect investors are now accessible to all via the blockchain.

Figure 3:
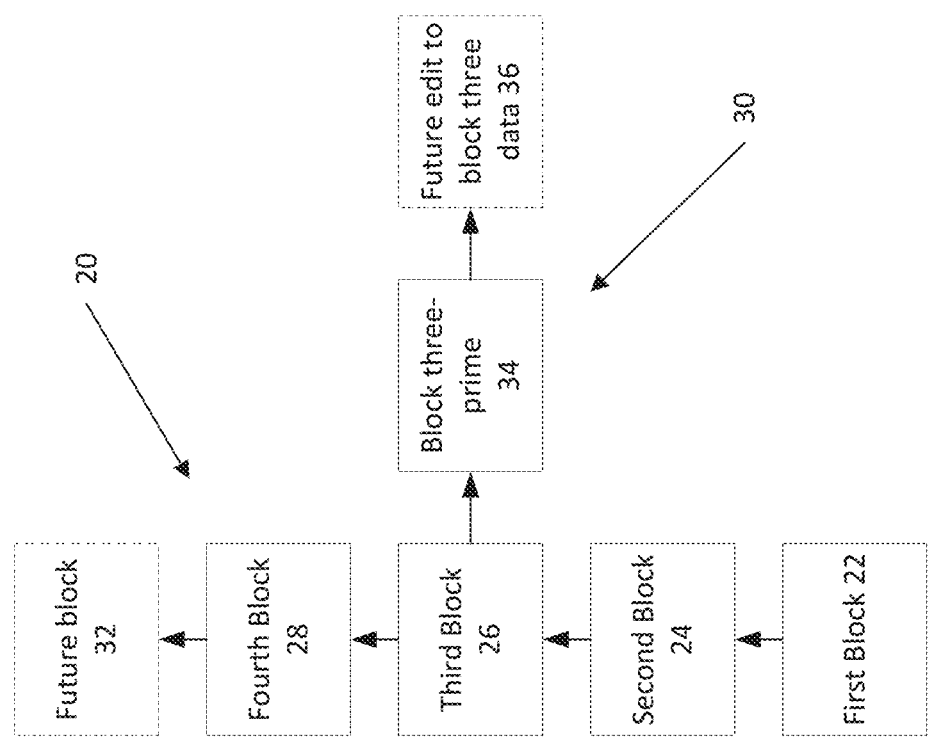
FIG. 3 is a block diagram of various cryptographic addresses and entities included within the data structure of the custom token.

FIG. 3 illustrates a blockchain data structure implementing branch blockchains. A main blockchain 20, begins from a first block 22 and includes a second block, 24 a third block 26 and a fourth block 28. The main blockchain 20 may be referred to as a first blockchain, or a primary blockchain. The number of blocks exists merely for illustration. In a real use case, the main blockchain 20 would include many, many more blocks over time. Each block is data storage. In some embodiments, while each block is appended to a chain data structure like a cryptocurrency blockchain, there is no associated cryptocurrency. That is, the node that is submitting new data, and thereby a new block to the blockchain, performs processing operations in order to reconcile the new block with a previous or last block.

The blocks are not mined, but rather are created each time a user transacts data. In an example, a user may save a two-page word document, and that may become a block, then a one-page document and save it as another block. Blocks are created instantly and hashed like a blockchain. This process occurs the same way with creating data. For example, a user may open a blank word document, type and save, and that document becomes a block.

Each block preferably contains some payload data along with a block ID, Last Hash, New Hash, User Hash, Time/Date, and Username of the data entry user. The data is encrypted ciphertext while stored in the blockchain 20, 30. The blocks are additionally hashed using a respective key pair associated with the user generating the block, or a user whom supervises the block generating user.

The payload or data may be of any suitable size. The block may store a single bit, or whole documents. The range of data includes fields on a form and/or whole forms of data. In some embodiments, blocks in the chain are each files (e.g., flat files) stored in disk. Where the Bitcoin blockchain is often stored as a single flat file that is continually modified, embodiments of the present system generate additional flat files for new blocks. The linked list aspects of the blockchain are supported by a file naming scheme whereby filenames are dynamically created to include a reference to the preceding block. The payload, or data for the block is stored within the flat file.

The blockchain 20 is immutable. Should a change be made at one node, forced synchronization causes that node to conform with other nodes where the block remained unchanged. Data in a database is often changed for numerous legitimate reasons. In some embodiments, new data or edits to old data are appended to the top of the blockchain 20 in a future block 32. In some embodiments, legitimate data edits are appended to a branch blockchain 30 from the block that contains the data to be edited. The branch blockchain 30 may be referred to as a second, third, or Nth blockchain, or as a sub-chain. The branch blockchain 30 has a genesis block that is on the main blockchain 20. In some embodiments, where a given block on the main blockchain 20 is not the genesis block of a branch blockchain 30, there has therefore been no edits to the relevant data stored in the given block. The existence of a branch blockchain for that block indicates modifications to the data.

Pictured in the figure the second block 26 includes data the user wants to edit. Instead of generating a new block on the main blockchain 20, in the future block 32 space, the edit to the data is represented in block two-prime 34. Block two-prime 34 is the second block in a branch blockchain 30 that uses the second block 26 of the main blockchain 20 as a new genesis block. As the data related to the second block 26 is further edited, those edits result in blocks added to the branch blockchain 30 in the future edit to block two data space 36.

When the data associated with the second block 26 is read, the system need only check the relevant branch blockchain 30, if it exists, rather than the entire main blockchain 20 for any reference to that data. The main blockchain 20 is used to represent all instances of data, whereas the branch blockchains 30 represent the changelog and current state of a given instance of data.

In some embodiments, the data in blocks is encrypted. The key to decrypt the data within a given block is stored according to the user's copy of their node client. In these embodiments, not all instances of the node client are enabled to read/write all blocks. For example, in some embodiments, Client A can read/write Client A blocks, and Client B can read/write Client B blocks, but Client A cannot read/write Client B blocks and vice versa.

Figure 4:
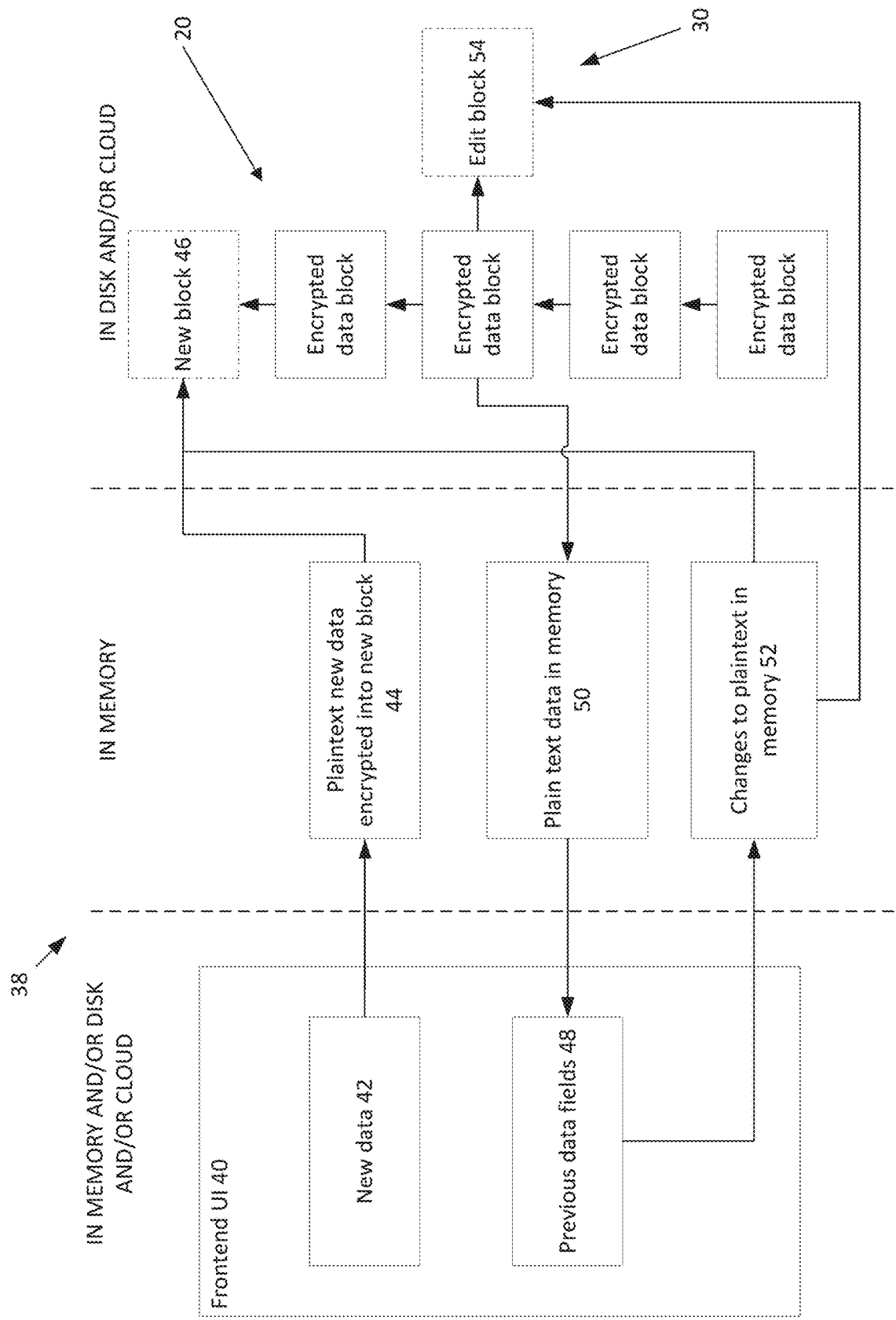
FIG. 4 is a block diagram illustrating a relationship between a client front end and accessibility to the blockchain.

FIG. 4 is a block diagram illustrating a relationship between a client front end and accessibility to the blockchain. A given user operates a node of a data manipulation system 38. The data manipulation system 38 includes a user's frontend UI 40 that references a blockchain 20, 30 stored on a disk, a cloud server, a hard disk of a blockchain network peer-node, or other suitable storage medium or storage location. The data within the blockchain 20, 30 is encrypted and is decrypted in local system memory for use in the frontend UI 40. "Memory" in this context refers to random-access memory ("RAM") or other volatile storage structures. Memory is distinct from "disk" or "hard disk" storage, which refers to non-volatile storage.

Use of the frontend UI 40 obfuscates the existence of the blockchain 20, 30 and the user of the frontend UI 40 is not necessarily aware of the blockchain's existence. The blockchain 20, 30 is a data structure that securely stores the user's data. The blockchain 20, 30 exists in the backend of data manipulation system 38 and the user does not directly interact with the blockchain. A human user would be unable to make sense of the block files because each contains encrypted and hashed data. Thus, a malicious actor must have access to the frontend UI 40, or local system memory while the frontend UI 40 is in use to access decipherable data.

The frontend UI 40 is customizable to a given user or organization's purpose. Whatever data needs that user/organization has, the frontend UI 40 is built accordingly. While using the frontend UI 40 a user enters new data 42 via whatever fields or input interface is present in the frontend UI 40. While that entered new data 42 is still in local system memory, the data manipulation system 38 converts that data 44 into a new block 46 on the blockchain 20. The new block 46 is appended to the end of the blockchain 20. The new data 42 is encrypted in real-time, in memory, after being entered by the user. The encrypted data is then stored in the new block 46. In some embodiments, blocks are written to the node, the server and sent to the cloud/backup drive at the same time. Blocks sent to the server and backup drive are done so using SSH transmission allowing an end-to-end encrypted tunnel.

Where a user seeks previously entered data 46, the data manipulation system 38 triggers a process whereby data is retrieved from the blockchain 20,30, the data is decrypted and presented to the user on the frontend UI 38. Data is retrieved via use of an unencrypted userID portion of each block. Based on the userID, the system identifies the blocks that will have decryptable data. The data retrieval process is transparent to the user based on operations of the frontend UI 40. The source of the data is not expressly revealed to the user. Data is retrieved from the blockchain 20, 30, and decrypted in memory 50. Once decrypted in memory 50, the plaintext data is represented to the user on the frontend UI 40.

Where the user makes changes to previously entered data 48, the changes are made in memory 52, encrypted and put into either a new block 46 or an edit block 54 on a branch blockchain 30 based on embodiment implemented and/or the type of data being modified. In some embodiments without branch blockchains 30, edited data goes in new block 46 and is appended to the main blockchain 20.

Data security is maintained through keeping unencrypted data off hard disks. The window for an attacker to consume the data is significantly narrower than systems that transmit unencrypted data or store unencrypted data.

Figure 5:
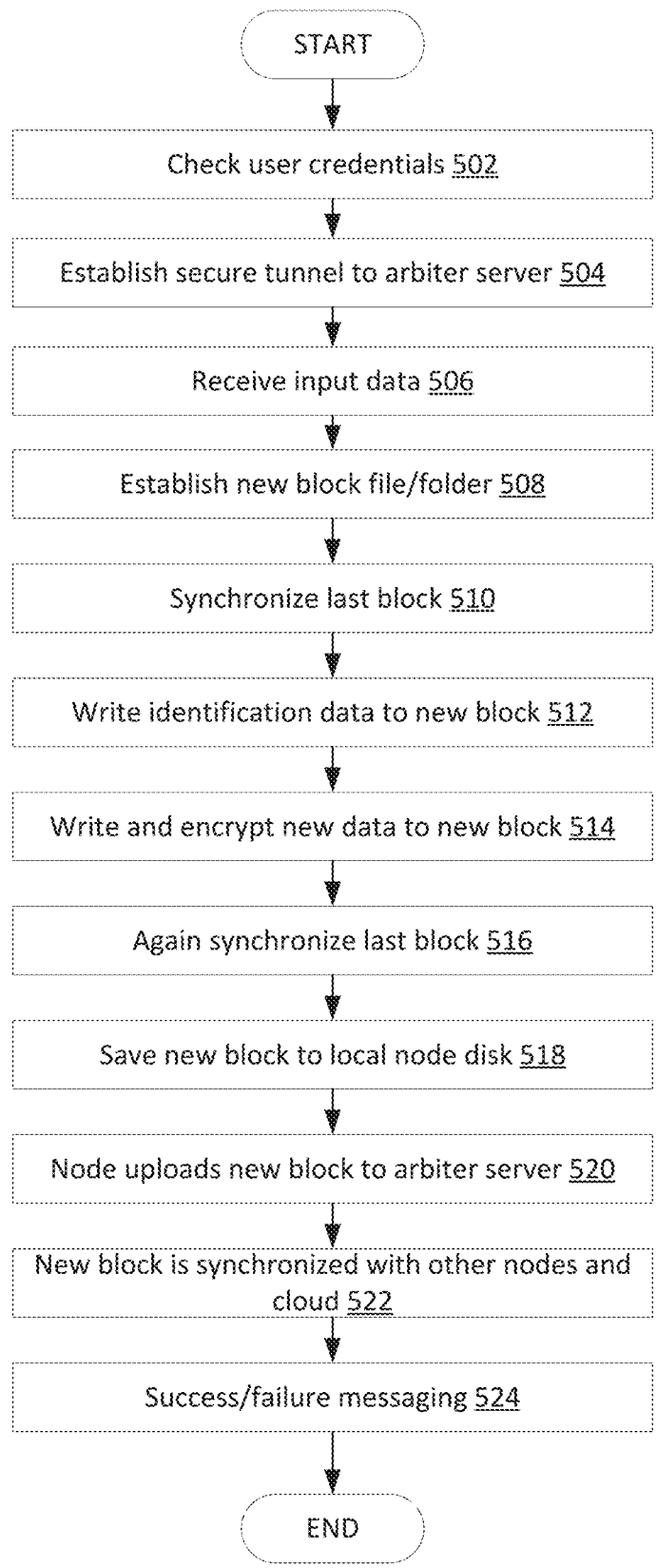
FIG. 5 is a flowchart illustrating a method of appending data to the blockchain.

FIG. 5 is a flowchart illustrating a method of appending data to the blockchain. Users append data to the blockchain via frontend UI. Legitimate appending can be initiated only through the frontend UI, by a logged in user, whom has entered log in credentials. In some embodiments, Cryptographic keypairs enforce the ability to append to the blockchain. The program code that accesses the keypairs in the frontend UI cannot be executed without being logged in.

Thus, in step 502 the system ascertains the current user's credentials. The credentials can be inspected through a number of means including multi-factor authentication (MFA). A non-exhaustive list of factors may include geolocation locked (e.g., the location of the device using the frontend UI), second device locked, external time-to-live codes, biometric key, and login credentials.

In step 504, the local node establishes a secure tunnel (e.g., SSH and/or SCP encrypted tunnel formats) with a first server via login information. In some embodiments, the first server may be referred to as an arbiter server. The arbiter server is configured to coordinate block ordering across multiple simultaneous attempts at appending to the blockchain by a number of nodes. In step 506, the local node, via the frontend UI, receives input data and stores the data as a variable in local system memory. Display of the new data on the frontend UI is performed via access to the memory. The new data, in plaintext form, is not stored on the local disk drive of the local node. Whether the input data is appended to the main blockchain or a branch blockchain is a function of the data retrieval process (discussed in further detail below).

Based on an appending request by a local node, in step 508, an arbiter server generates a new block file or folder and synchronizes file or folder names with the local node. The arbiter server maintains the linear ordering of the blocks on the blockchain. Where the arbiter server generates a new block file, the arbiter server has established the local node's request into a given position on the blockchain. At this stage, the new block file or folder does not include any payload data. In an alternate embodiment, the local node first creates the new block file/folder and obtains a naming component from the arbiter server that establishes the linked list reference to the last block. During generation of the new block, the last block may change based on other nodes submitting blocks. The name of the new block is dynamically modified throughout generation to update reference to the last block.

This process does not change regardless of which portion of the blockchain is being appended to. Regardless of where the new block goes, there is still a new block on some chain. The naming convention of the new block indicates the order of the block in the blockchain. The names of the blocks are generated dynamically in order to accommodate multiple nodes simultaneously attempting to append data. In some embodiments, the block file/folder naming convention includes adding the "_x" to the end of the name, where x is the last block +".b1" (e.g., a file type designation). The file type designation ".b1" is an arbitrary choice, and any file name extension could be used. The system is configured to recognize particular file type designations based on system design. The new block is named using the last block number.

In step 510, the local node synchronizes the last block with the arbiter server to ensure the node has the most recent copy by comparing latest hash. In step 512, identifying data is inserted into the file/folder for the new block. Identifying data includes: a hash of the last block is inserted into the new block file, the userID of the logged in user, a new block hash, and a time/date stamp. The identifying data may be indicated in a header portion of the new block file or via use of delimiters. The synchronizer is enabled to re-order blocks when necessary (e.g., due to simultaneous submission) and ensures last hash integrity. The use of a last block integer counter updates file names during the appending process (in some embodiments, the update further includes the last hash). This file is also locked to a permission of 000 to ensure it cannot be altered by outside sources. In some embodiments, the local node reorders blocks locally based on time stamps of each received block.

In some embodiments, all portions of a block are encrypted in the block except the ID, last hash and hash. In the new block system, logging information will also be included in the block itself. The block includes an ID (last block #), last hash from the previous block, new hash, time/date stamp, logged username who created the block, the group affiliation and all new data to be encrypted.

Synchronization is a background process initiated by a separate software utility (per node) and is automatic. No user input is required. Synchronization loads at startup when a computer is rebooted/turned on and runs silently in the background, synchronization necessary missing or new blocks. The synchronization enables allows new blocks created during periods where no internet is available to be uploaded to the server, cloud and thereby available to other nodes. Renaming/re-ordering by block number in the file name is done automatically if needed and sorted by time/date stamp. Where the timestamps are encrypted, the blocks are decrypted top evaluate the timestamps and then re-encrypted and renamed using the new blocker ordering number.

In step 514, the local node encrypts (in memory) and writes the plaintext new data into ciphertext in the payload of the new block file/folder. The system does not encrypt the identifying data such as the last/new hash, user identification. In some embodiments, and the time/date is similarly not encrypted. In some embodiments, the new data may be written to the local copy of the new block file/folder prior to encryption, or vice-versa. In this manner, the plaintext of the new data does not exist outside of local system memory for more time than required to encrypt the plaintext.

The encryption is performed using a user associated key. In some embodiments, the user associated key is the private key or the user associated cryptographic keypair. In some embodiments, the key used to encrypt the new data is a separate unrelated key that indicates a permission level (e.g., all users within a given sub-class of users share a cipher key). Users in various levels of a hierarchy of users may have multiple cipher keys based on the level of permissions required to access the data. Examples of suitable encryption methods include SHA3-512 bit and AES-128 or 256 bit level encryption. In some embodiments, the system uses random strong passwords and hardware key lookup in a triple nested array. In some embodiments, the same, single cipher key is used across all permission levels and a given user's "key" instead refers to an association to block numbers that the system will implement the single cipher key upon to decrypt for that user. In those embodiments, the user's key is a matter of protocol permissions as opposed to cryptographic relationships.

In step 516, the last block is again synchronized between the local node and the arbiter server to determine that the local node still has the most recent version. In step 518, the new block is saved to disk on the local node. In step 520, the local node uploads the new block as saved to the arbiter server via the secure communication tunnel. Integrity is constantly checked to ensure the last block is truly the last block (e.g., if during the save process the last block changes from 60 to 61, then the node will write the block as 62, upload it and then upload the new last block file with the number 62). The synchronizer is there just in case two identically numbered blocks are attempted to be written at the same time.

In step 522, the new block is synchronized with other nodes and a second server. In some embodiments, the second server may be referred to as a cloud server. In step 524, a success or failure message is issued to the participant devices.

Blocks are transmitted to the server and cloud drive in near real time on all nodes, the block exists on the server and backup drive. The node downloads the block back and then reads the encrypted data into an array (in memory). The data is then decrypted in the array. The last block is appended twice—once before the block data is written (in step 512) in and again (step 516) after the block data is written to ensure the given block is truly the last block. If the new last block is not on the server/backup drive yet, the arbiter server generates an error and a small wait time is in place to then try again. The synchronizer ensures no duplicate blocks exist and performs re-ordering if any two nodes just happen to write the same block at the same time (down to the millisecond)—if so, the time/date stamp is used to ensure order (again, down to the millisecond). The earliest time is given preference.

Figure 6:
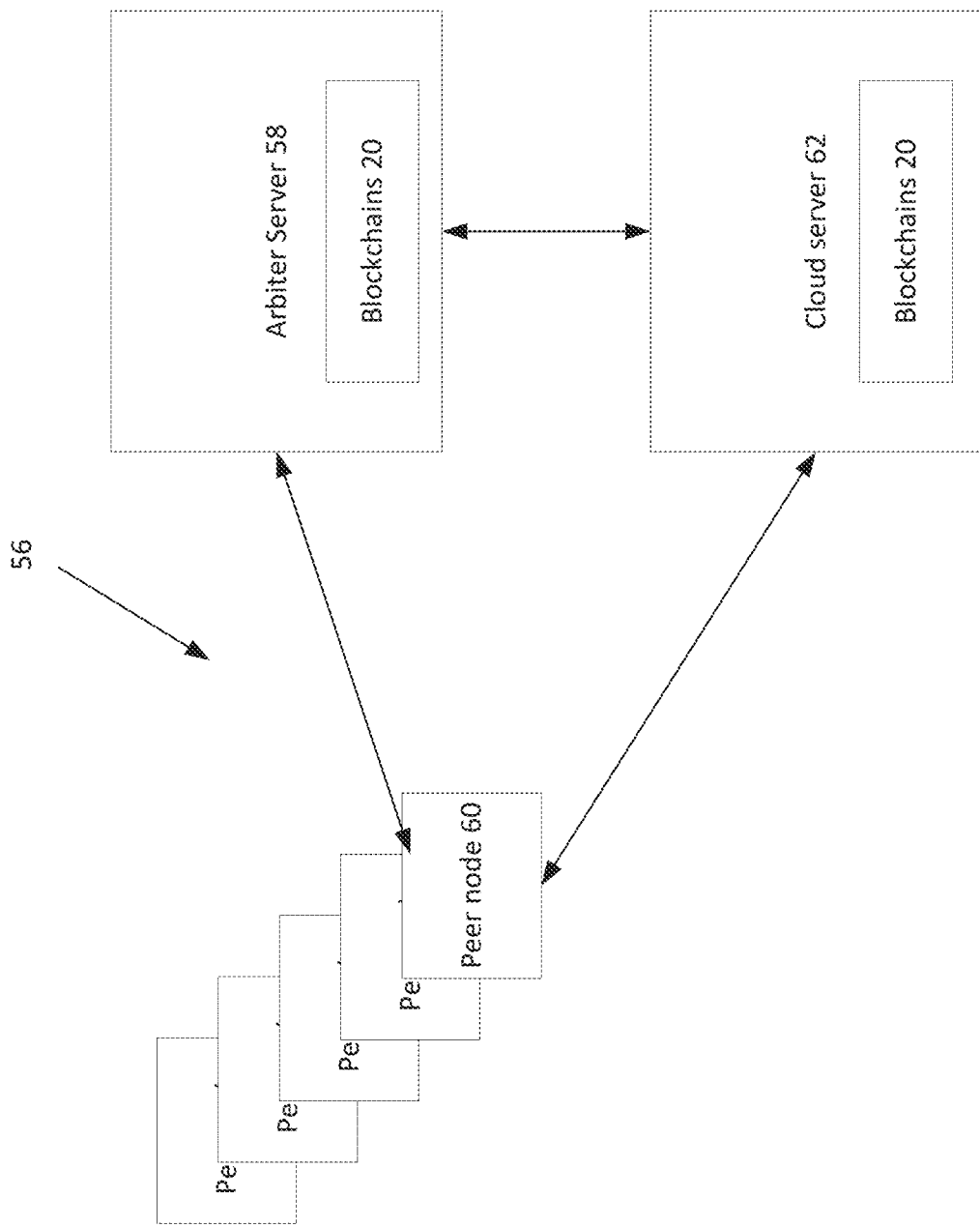
FIG. 6 is a block diagram of an arbiter server in a peer network.

FIG. 6 is a block diagram of an arbiter server 56 in a peer network 58. The peer network 56 includes a number of distributed nodes, or peer nodes 60. The peer nodes 60 synchronize with copies of the blockchains 20 stored on both the arbiter server 58 and the cloud server 62. For a local node to operate on the peer network 58, the peer nodes 60 do not necessarily each have to store the entire, or most up to date versions of the blockchain 20.

Synchronization of the peer nodes 60 occurs at regular intervals while the peer nodes 60 are communicating with the network; however, a given node 60 that has been offline for some time will not necessarily have the most, up to date version of the blockchain 20. Where a node is rejoining the network after a period of inactivity, synchronization causes the node to receive all missing blocks. In some embodiments, the peer nodes 60 communicate directly between one another while executing a periodic synchronization process on the blockchain data and obtain updated synchronization data from amongst one another.

Synchronization is an analog process to consensus conducted in traditional cryptocurrency based blockchains. Through synchronization, the immutability of the blockchain 20, 30 is enforced.

Figure 7:
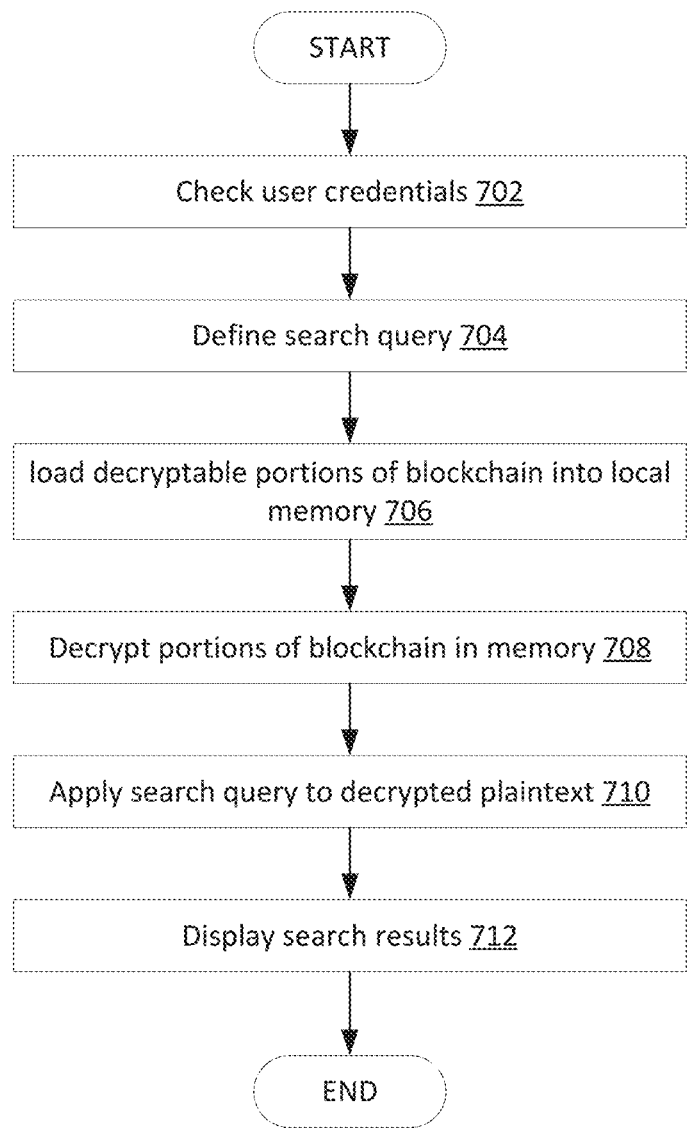
FIG. 7 is a flowchart illustrating a method of legitimate data retrieval from the blockchain.

FIG. 7 is a flowchart illustrating a method of legitimate data retrieval from the blockchain. A user of the frontend UI is not made expressly aware of the presence of the blockchain. Data requests of data on the blockchain can be made in a number of ways based on the configuration of the frontend UI. However, ultimately, the frontend UI operates using a search function. The search query used may be user generated or interface generated based on configuration and each given use case.

Similarly to appending data, users must be logged in to the frontend UI in order to retrieve data as plaintext. Anyone with access to the blockchain may view the data therein, but the data is stored as ciphertext and is incomprehensible to those without an associated cipher key that is accessed (indirectly) via the frontend UI. Thus, in step 702, the local node verifies user credentials in the same manner as in step 502 of FIG. 5.

Users have varying levels of permissions. In some embodiments, users are only able to make requests of data they appended to the blockchain. In some embodiments, users are only able to make requests of data within their user class (or of lower tier user classes). User class tiers may be sideways—that is, even a highest tier user in one branch may not have access to data appended by users of a sideways (but lower) user class (e.g., a CEO is prevented from accessing data entered by HR regarding confidential personnel complaints).

In step 704, the system defines the search query. If the frontend UI is looking to fill a particular field, then the search query may be defined by the frontend UI. Specifically, when data is entered in the related field, a unique code may be appended to the data that corresponds directly to a search query. Thus, the search query will only be satisfied by data including the unique code. Search results for the query will have a single result and the UI element retrieves the proper data. In some embodiments, the search query is less particular, and a given user may be searching the blockchain for desired data using other techniques.

In step 706, the local node loads portions of the blockchain that may be decrypted by that user and stores the plaintext in local memory. The blocks that are loaded into node local memory may be either a local copy stored on the local disk or from either the arbiter server or the cloud server. The portions of the blockchain that may be decrypted by the given user are indicated based on the unencrypted userID recorded in each block.

In step 708, the local node decrypts the blocks stored in memory. The decryption makes use of an appropriate cipher key held by the local node and authorized by the active user. Decryption of the blockchain may occur in parallel because there is a separate file for each block. The encryption is not blockchain wide (e.g., every character of the blockchain) but rather performed on a per block basis.

In step 710, the search query is applied to the plaintext of the decrypted blocks. Where the blockchain has become too large for the user to store entirely in memory, the search query may be applied to the blocks as each is decrypted. The searching node discards blocks from memory where a search engine operating with the search query is below a threshold confidence or relevance score on the plaintext of the given block. In contrast to the described techniques, databases are generally encrypted or decrypted in their entirety as opposed to on an entry-by-entry basis as described herein. Encryption/encryption on the block level is more discrete and enables more efficient data processing. Additionally, each data element in a database tends to have a larger data size and is therefore more cumbersome both algorithmically and individually.

The threshold confidence is based on an applied search algorithm. Where the search engine makes use of exact matches (e.g., seeking specific pointer codes) plaintext blocks that are below exact matches may be discarded. The search engine may make use of a keyword search or a knowledge graph wherein results are given confidence or relevance ratings connected to how connected a given result is the initial keyword search or how related the given result is based on the knowledge graph. Regardless of the search engine style used, a threshold filter is applied to results in each block. Where a given block does not include any plaintext content that is above the threshold confidence or relevance score, there is little reason to retain that data in limited memory space. Accordingly, the low confidence/relevance score plaintext data is discarded.

As one block is discarded, a new block may be read into memory, decrypted and searched (the results of the search are discarded or kept in memory as applicable). "Discarding" refers to clearing relevant space in the volatile memory. When a decrypted block is discarded, the original block remains stored in non-volatile storage in encrypted form. However, the plaintext version is gone. In step 712, the search results are presented via the frontend UI.

Figure 8:
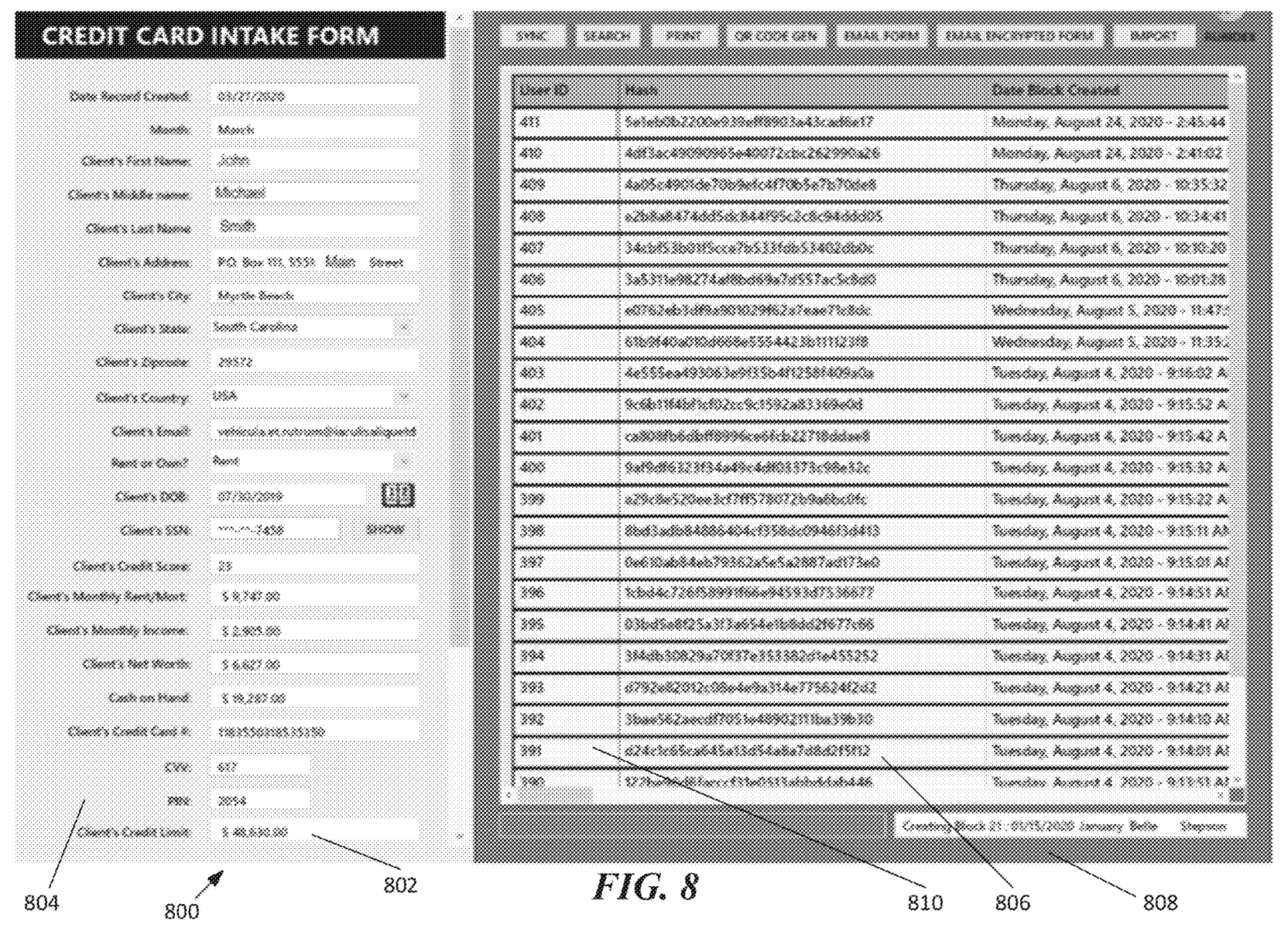

FIG. 8 is a screen shot of a data entry interface and an associated blockchain. In some embodiments, the blockchain data structure is largely invisible to average users. That is that the connection of the data represented in the fields and the encrypted data in the blockchain data structure does not need to be displayed to the user via a user interface for function of the user interface. For example, depicted in the figure is a data entry interface 800 for a credit card application. As a user enters data into the fields 802 of the credit card application form 804, this data is converted into an encrypted block 806. In some embodiments, a new block is generated for each field 802 and generated each time the user navigates away from that field (e.g., clicks on another field).

New blocks are generated in response to a change in the field 802. The change in the field 802 may be detected via the user interface application. Specifically, the input interface identifies that changes had been made based on data changed in memory (e.g., keystroke detection or as part of the process of changing data in memory). Alternatively, changes may be detected based on encrypting the current data in memory and comparing to data in the encrypted blocks in non-volatile storage. Where there is are discrepancies, the data had been changed and the node generates a new block.

In some embodiments, rather than generate a single block per field 802, a single block is used for the entire form 804. In addition to the data entered by the user, the viewer application may automatically include pointer data that is used to indicate which fields the user entered data is connected with.

On the right side of the figure, a portion of the blockchain data structure is depicted 808. The blocks 806 shown update as a user completes the credit card intake form on the user interface of the application. Notably, the user ID column 810 on the left side of the depiction of the blockchain data structure indicates that numerous users are adding to the blockchain contemporaneously. Each are performing independent data entry tasks.

Figure 9:
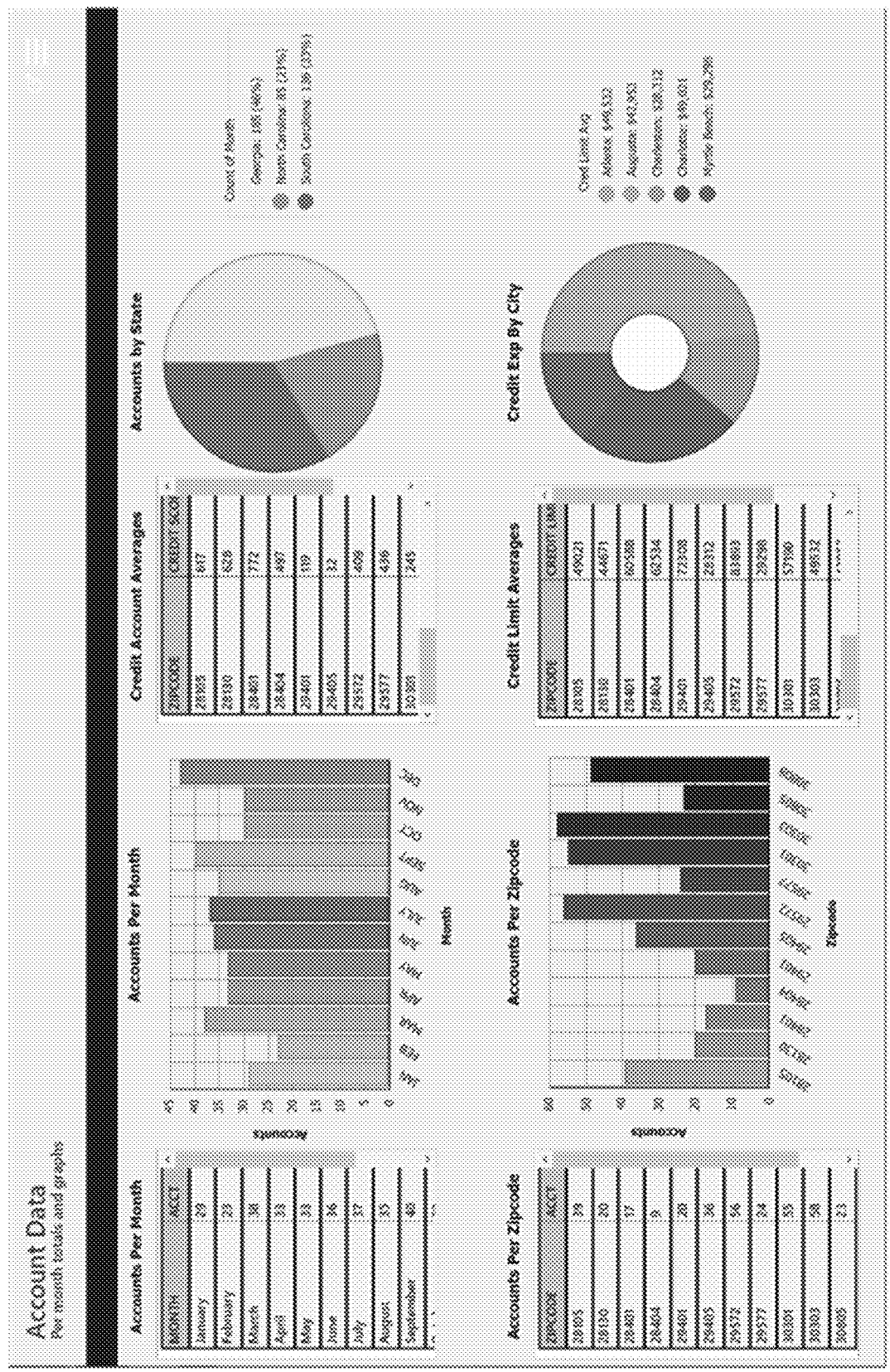
FIG. 9 is a screen shot of a blockchain viewer application that draws from a blockchain.

FIG. 9 is a screen shot of a blockchain viewer application 900 that draws from a blockchain. Depicted in the screenshot is a viewing page for an embodiment of the blockchain viewer application 900. The pie charts and tables depicted illustrate an example of structured data from the blockchain data structure that indicates distribution of credit card accounts nationwide and over a time-series.

The example specifically calls credit card data for a large number of customer accounts and displays the data in a single location. The depicted data is automatically retrieved when the page is accessed. Each representation of data is a graphical conversion of source data extracted from relevant portions of the blockchain data structure. Where a given user of the application has permissions necessary to decrypt the relevant portions of the blockchain, those portions are drawn into memory, decrypted, then applied to the viewer application as input for functions that display the recorded data in a particular manner.

The data called upon from the blockchain data structure is a set of flat files that are comparatively small and thus calling up this data is quick. The function and manner of representation of the data is bound in the viewer application itself. Unlike many applications of database software, where stored data includes cumbersome data handling code (e.g., how data should be keyed, how the data may be presented, etc.), the handling of the data in the flat files is performed by the viewer application itself. The shift of the handling to the viewer application from the data itself makes each data element more lightweight and reduces overall processing time/load to call and present data.

Figure 10:
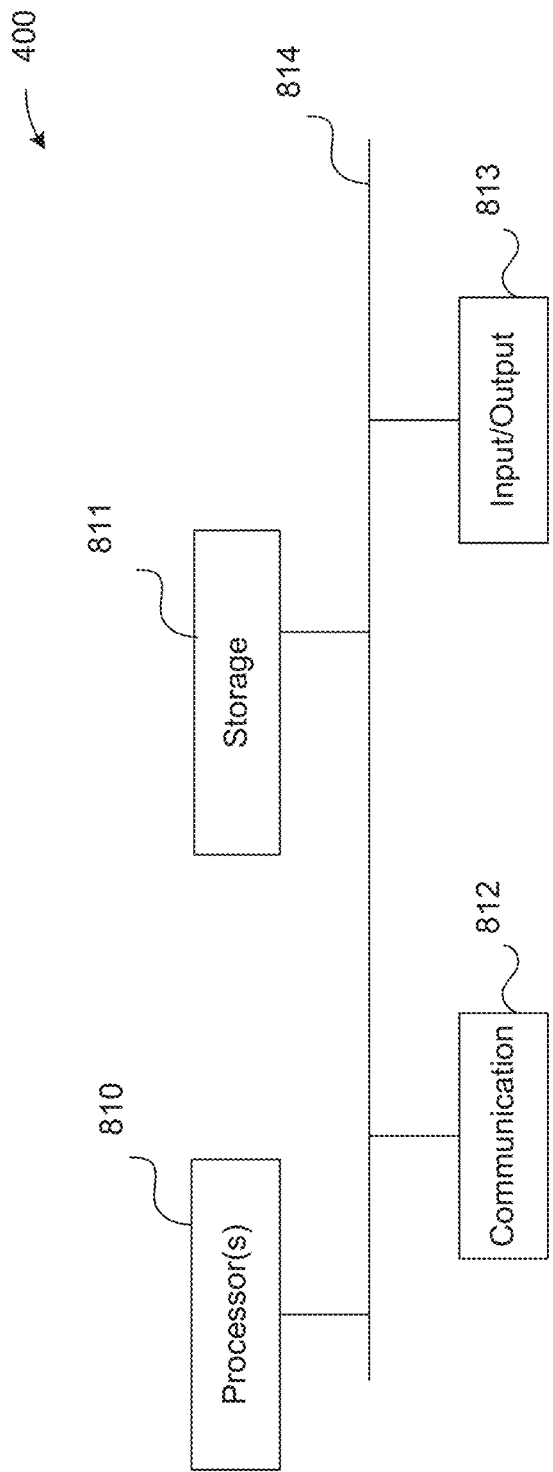
FIG. 10 is a block diagram of an exemplary computing system.

FIG. 10 is a high-level block diagram showing an example of a processing device 1000 that can represent a system to run any of the methods/algorithms described above. A system may include two or more processing devices such as represented in FIG. 10, which may be coupled to each other via a network or multiple networks. A network can be referred to as a communication network.

In the illustrated embodiment, the processing device 1000 includes one or more processors 810, digital storage 1011, a communication device 1012, and one or more input/output (I/O) devices 1013, all coupled to each other through an interconnect 1014. The interconnect 1014 may be or include one or more conductive traces, buses, point-to-point connections, controllers, scanners, adapters and/or other conventional connection devices. Each processor 1010 may be or include, for example, one or more general-purpose programmable microprocessors or microprocessor cores, microcontrollers, application specific integrated circuits (ASICs), programmable gate arrays, or the like, or a combination of such devices. The processor(s) 1010 control the overall operation of the processing device 1000. Digital Storage 1011 may be or include one or more physical storage devices, which may be in the form of random access memory (RAM), read-only memory (ROM) (which may be erasable and programmable), flash memory, miniature hard disk drive, or other suitable type of storage device, or a combination of such devices. Digital storage 1011 may store data and instructions that configure the processor(s) 1010 to execute operations in accordance with the techniques described above. The communication device 1012 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1013 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 1000 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A data storage method comprising:
receiving new data via an input interface on a local blockchain node, wherein each block on the local blockchain node comprises a flat file including a naming convention that designates block order in the local blockchain node;
storing the new data as plaintext in local memory while displaying on a user interface;
writing the new data as encrypted ciphertext on local non-volatile storage as a new block on a local copy of a blockchain data structure;
transmitting the new block to a peer network to be appended to respective blockchain data structures throughout the peer network,
receiving, at the local blockchain node through the peer network, a second new block; and
ordering the second new block on the local blockchain node based on the naming convention.

2. The method of claim 1, wherein each block on the local blockchain node further includes a timestamp, the method further comprising:
in response to the new block and the second new block having a matching block order as designated by the naming convention, disambiguating, by the local blockchain node, the new block and the second new block by creation order using the timestamp; and renaming either of the new block or the second new block based on the naming convention signifying which block was created subsequent to the other.

3. A data storage method comprising:
receiving new data via an input interface on a local blockchain node, wherein each block on the local blockchain node comprises a flat file including a naming convention that designates block order in the local blockchain node;
storing the new data as plaintext in local memory while displaying on a user interface;
writing the new data as encrypted ciphertext on local non-volatile storage as a new block on a local copy of a blockchain data structure;
transmitting the new block to a peer network to be appended to respective blockchain data structures throughout the peer network,
connecting, by the local blockchain node, to the peer network after an offline period; and
in response to said connecting, syncing, by the local blockchain node, copies of the blockchain data structure with the peer network beginning with the most recent blocks.

4. The method of claim 3, wherein said writing and transmitting steps are performed prior to completion of said syncing.

5. A data storage method comprising:
receiving new data via an input interface on a local blockchain node;
storing the new data as plaintext in local memory while displaying on a user interface;
writing the new data as encrypted ciphertext on local non-volatile storage as a new block on a local copy of a blockchain data structure;
transmitting the new block to a peer network to be appended to respective blockchain data structures throughout the peer network,
executing a blockchain viewing application on the local blockchain node, the blockchain viewing application configured to verify a set of user login credentials for a first user, the first user having a first user key;
identifying a subset of the blockchain data structure that is decryptable by the first user key;
loading the subset of the blockchain data structure into local memory on the local blockchain node; and
decrypting the subset of the blockchain in local memory into plaintext.

6. The method of claim 5, further comprising:
identifying, by the blockchain viewing application, a physical location of the local blockchain node, and whereby the subset of the blockchain data structure that is decryptable by the first user key is subject to whether the physical location of the local blockchain node falls within a predetermined geofence.

7. The method of claim 5, further comprising:
receiving a search query from the first user via a graphic user interface of a blockchain viewing application;
applying the search query to the plaintext; and
displaying, by blockchain viewing application, search results in memory to the first user.

8. The method of claim 5, further comprising:
displaying, via the blockchain viewing application, a graphic user interface including data field pointers; and
populating the data field pointers from the decrypted subset of the blockchain data structure in local memory.

9. A secure data retrieval method comprising:
maintaining a copy of a blockchain data structure on a local blockchain node, wherein the blockchain data structure includes a set of encrypted blocks of data that are linked to one another in order;
executing a blockchain viewing application on a local blockchain node, the blockchain viewing application configured to verify a set of user login credentials for a first user, the first user having a first user key;
identifying a subset of the blockchain data structure that is decryptable by the first user key;
loading the subset of the blockchain data structure into local memory on the local blockchain node; and
decrypting the subset of the blockchain data structure in local memory into plaintext.

10. The method of claim 9, further comprising:
identifying, by the blockchain viewing application, a physical location of the local blockchain node wherein the subset of the blockchain data structure that is decryptable by the first user key is subject to whether the physical location of the local blockchain node falls within a predetermined geofence.

11. The method of claim 9, further comprising:
receiving a search query from the first user via a graphic user interface of a blockchain viewing application;
applying the search query to the plaintext; and
displaying, by the blockchain viewing application, search results in memory to the first user.

12. The method of claim 9, further comprising:
displaying, via the blockchain viewing application, a graphic user interface including data field pointers; and
populating the data field pointers from the decrypted subset of the blockchain data structure in local memory.

13. A system of data storage comprising:
a processor implemented on a local blockchain node;
a non-volatile data store including a copy of a blockchain data structure, wherein data elements of the blockchain data structure are encrypted, and wherein each block on the blockchain data structure comprises a flat file including a naming convention that designates block order in the local blockchain node; and
a memory including instructions that when executed cause the processor to:
receive new data on the local blockchain node;
store the new data as plaintext in the memory while displaying on a user interface;
write the new data as encrypted ciphertext the non-volatile data store as a new block on to the copy of the blockchain data structure;
transmit the new block to a peer network to be appended to respective blockchain data structures throughout the peer network;
receive, at the local blockchain node through the peer network, a second new block; and
order the second new block in the non-volatile data store based on the naming convention.

14. The system of claim 13, wherein each block on the local blockchain node further includes a timestamp, the memory further including instructions that when executed cause the processor to:
in response to the new block and the second new block having a matching block order as designating by the naming convention, disambiguate, by the local blockchain node, the new block and the second new block by creation order using the timestamp; and rename either of the new block or the second new block based on the naming convention signifying which block was created subsequent the other.

15. The system of claim 13, wherein each block on the local blockchain node comprises a flat file including a naming convention that designates block order in the local blockchain node, the memory further including instructions that when executed cause the processor to:
    connect, by the local blockchain node, to the peer network after an offline period; and
    in response to the connection, syncing, by the local blockchain node, copies of the blockchain data structure with the peer network beginning with the most recent blocks.

16. The system of claim 13, the memory further including instructions that when executed cause the processor to:
    execute a blockchain viewing application on the local blockchain node, the blockchain viewing application configured to verify a set of user login credentials for a first user, the first user having a first user key;
    identify a subset of the blockchain data structure that is decryptable by the first user key;
    load the subset of the blockchain data structure into the memory on the local blockchain node; and
    decrypt the subset of the blockchain data structure in the memory into plaintext.

17. The system of claim 16, further including:
    a location sensor configured to identify a physical location of the local blockchain node via GPS or IP tracing, and whereby the subset of the blockchain data structure that is decryptable by the first user key is subject to whether the physical location of the local blockchain node falls within a predetermined geofence.

18. The system of claim 16, the memory further including instructions that when executed cause the processor to:
    receive a search query from the first user via a graphic user interface of a blockchain viewing application;
    apply the search query to the plaintext; and
    display, by blockchain viewing application, search results in the memory to the first user.

19. The system of claim 16, the memory further including instructions that when executed cause the processor to:
    display, via the blockchain viewing application, a graphic user interface including data field pointers; and
    populate the data field pointers from the decrypted subset of the blockchain data structure in the memory.

* * * * *